Figure 1:
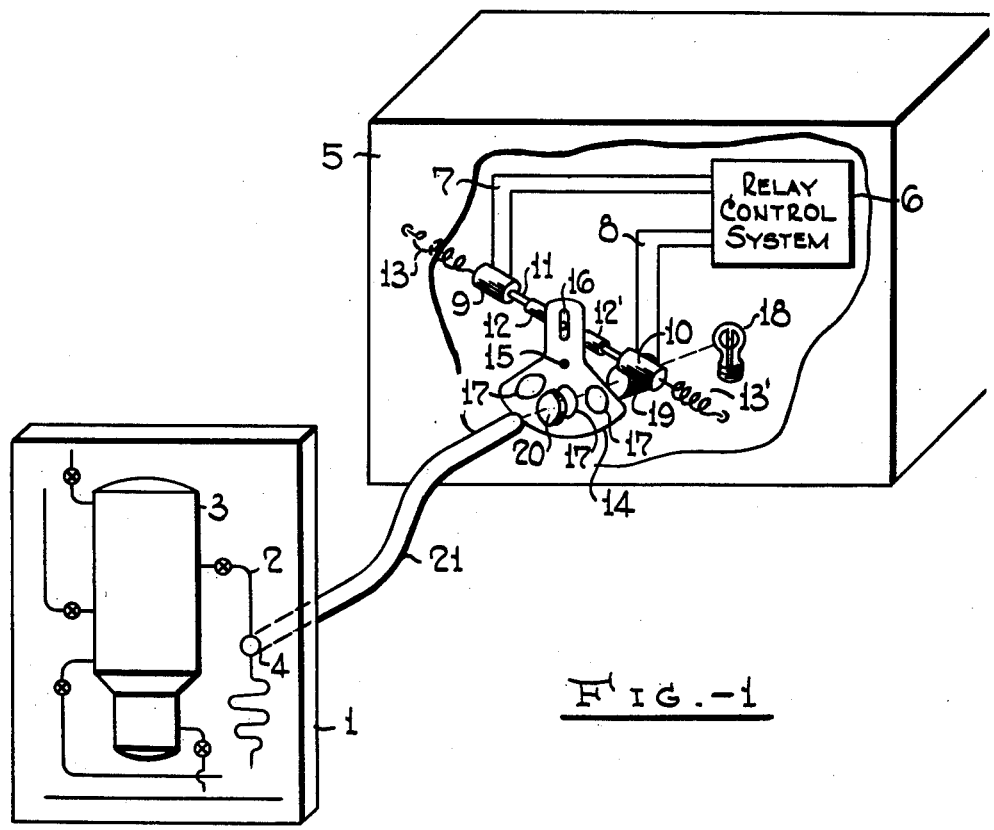

May 11, 1954  O. G. LEWIS  2,678,431

CONTROL PANEL DISPLAY SYSTEM

Filed Oct. 1, 1951

Oliver G. Lewis Inventor

By W. O. T. Heilman Attorney

Patented May 11, 1954

2,678,431

UNITED STATES PATENT OFFICE 2,678,431

CONTROL PANEL DISPLAY SYSTEM

Oliver Griffith Lewis, Westfield, N. J., assignor to Standard Oil Development Company, a corporation of Delaware Application October 1, 1951, Serial No. 249,173

5 Claims. (Cl. 340—225)

This invention concerns a novel arrangement for the indication of operational variables of a process on a control or instrument panel. The arrangement includes a light source in conjunction with a variably controlled filter system and a transparent plastic rod. Varying operational conditions are exhibited on a panel exposing the termination of the plastic rod, in accordance with changes of the filter arrangement provided. The arrangement is thus characterized by provision for exhibiting any desired number of control indications utilizing a single light source and a single instrument panel display point.

At the present time, in chemical processing, refining operations, ore reduction, and many other chemical or physical processing operations, control and instrumentation systems are employed, necessitating display of control information on an instrument panel. For example, it has now become common to provide instrument panels which diagrammatically represent a flow diagram of the process which is being controlled. Indicators of the critical process variables may be positioned on the portion of the flow plan provided on the panel corresponding to the particular step of the process from which this information is received. In this type of system it is highly desirable to be able to arrange recorders and/or indicators on the control panel within the dimensions of the diagrammatic flow plan represented, so as to clearly indicate the conditions prevailing in a given portion of the process operation. As a result it is frequently found that insufficient space is available on the control panel to conveniently and effectively provide for a display of the desired control information at the particular portion of the panel to which the information is applicable.

The display of control information by any of the presently used indicators is particularly complicated in those installations which may accidentally be exposed to combustible vapors from the process being controlled and which consequently require the use of explosion-proof housings. At the present time the control relays associated with indicating lights arranged on a control panel must be mounted on the panel directly behind the light in a relatively large explosion-proof case. In any control assembly utilizing commercially available control equipment and display mechanisms, many unitary control elements are required. As a result, the panel required to accommodate these elements is often larger than might be desired, and yet still may cause crowding of the necessary equipment so as to complicate repair and maintenance operations.

The present invention is designed to overcome these shortcomings of presently employed display or indicator systems for process control information. The invention is of application to the indication of control information of any character and in virtually any manner. However, as indicated, the invention is of particular application to a control panel which represents the complicated flow diagram of a process, necessitating the display of a great many process determinants in a relatively small space.

The present invention permits the removal of relay systems or other control apparatus for light indicators from the proximity of the control panel to any desired point removed from the control panel. It is possible, for example, to position relays associated with an indicating light system, at a distance from 2 to 10 feet or more from the panel. These elements may be maintained in an explosion-proof housing at this point so as to eliminate the necessity for the placement of this bulky housing in the proximity of the panel itself. The control information provided by this equipment, in the form of a light transmitted signal, can then be displayed on the control panel by transmission through a transparent plastic rod extending from the explosion-proof control instrumentation housing to the panel. As a particular feature of the present invention, a single light source associated with a single light transmitting plastic rod and a single display point on a panel may be used to provide any desired number of variable indications. For example, in indicator may be varied in color so as to appear red, yellow, or green, for example, by positioning a controlled filter system in the range of light between the single light source and the associated plastic transmitting rod. The filter system may best be positioned in the explosion-proof housing in which the relay controls or other equivalent are maintained. On variation of a process variable, the indicator light exhibited on the control panel may then be changed in color by movement of the filter with respect to the light.

It is apparent that this general system permits substantial savings in the size, complexity, and cost of instrument panels and particularly of graphic control panels.

Figure 2:
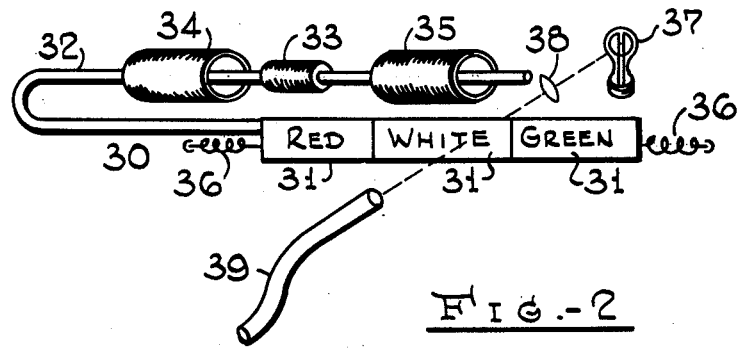

In the appended drawings, Figure 1 illustrates a preferred embodiment of the invention depicting a diagrammatic or graphic control panel provided with one indicator capable of indicating three different signals, utilizing a remotely positioned explosion-proof instrument housing from which light may be transmitted to the panel through a transparent plastic rod. Figure 2 diagrammatically illustrates one of the alternative arrangements of the filter actuating mechanism which may be employed in this general system.

Referring first to Figure 1, the numeral 1 designates a control panel associated with a distillation operation of the character which is generally indicated by the flow diagram depicted on the panel 1. It is assumed that information is desired as to side stream withdrawal 2 from the distillation tower 3 of the character diagrammatically illustrated. For example, it may be desired to display a determination of the volume of fluid withdrawn through side stream withdrawal 2. It may be desired to indicate the flow of this stream in terms of normal flow or flow rates above or below normal. To provide this information it would be suitable to actuate a white light at point 4 on the control panel when normal fluid efflux is maintained through line 2. For flow conditions substantially greater than normal flow, a red light could be operated at the same point on the panel; and finally, for flow conditions substantially lower than normal, a green light could be actuated at the indicated point on the control panel. In accordance with this invention, this is achieved by positioning a control indicator system maintained in an explosion-proof housing 5 at some point removed from the panel 1. For the purpose indicated, any one of a number of commercially available relay control systems may be employed, of the character providing actuation of different electrical circuits in response to variations in signal from a flow sensing device associated with the distillation tower to be controlled. For example, a flow control indicator recorder may be employed of the character providing an electrical signal proportional to the flow rate prevailing. This electrical signal may be conducted to a relay control system 6 of the character which will actuate one or the other of two electrical circuits when flow is either above or below a pre-determined level. For example, when flow of fluid in a line to be controlled has dropped below a desired level so as to provide a relatively low output electrical voltage from the flow sensing device, a first relay actuated circuit 7 may be closed, initiating the flow of electrical current through circuit 7. Again, when flow of fluid in the line to be controlled has exceeded a desired magnitude, the resultingly high electrical output of the flow sensing device may cause actuation of a second relay in relay control system 6 to initiate current through an electrical circuit 8. As illustrated, the electrical circuits 7 and 8 may be connected to solenoid coils 9 and 10. Associated with these two solenoid coils is a common core piece 11, carrying 2 cores 12 and 12'. Cores 12 and 12' are positioned on the core piece 11 so as to be at intermediate positions on the rod with respect to the two solenoid coils 9 and 10. Consequently, on actuation of circuit 7, solenoid coil 9 will pull core 12 inwardly towards the solenoid so as to move the core piece 11 from right to left on the drawing. Similarly, actuation of circuit 8 and solenoid coil 10 will move the core piece from left to right on the drawing. By fixing springs 13 and 13' to either end of the core piece, the core piece may be caused to return to a median position when neither of the two solenoids is operated. By this arrangement the core piece can be maintained in three different positions. Arranged adjacent to the core piece 11 is a filter support 14 which is pivoted on a pivot 15 so as to be rotatable about this point. A slotted opening may be positioned in the filter support 14 adjacent the core piece 11 so as to contain a pin 16 fixed to the core piece. Movement of the core piece 11 as described would thus cause the filter support 14 to rotate to any one of three possible positions. Light filters 17 are fixed in the filter support 14 equidistant from the pivot point 15 and at a circumferential displacement so that each filter will be brought to the same position when the core piece 11 and the filter support 14 is maintained in either one of the three possible positions. A light source 18, preferably in combination with a condensing lens system 19 is arranged to transmit light through the common point at which the three filters 17 may be moved by actuation of this arrangement. A lens or transparent glass 20 may be fixed in the casing of the explosion-proof housing in the range of light from the light source 18 through lens 19 and through one of the three filters 17. Adjacent lens 20 or in juxtaposition therewith is a transparent plastic rod 21 extending from the explosion-proof housing to the point 4 on the control panel. If desired, the plastic rod 21 may be fixed in the explosion-proof housing in sealed relationship therewith in place of the lens 20. The plastic rod may comprise any desired plastic material provided that it be transparent and light conductive. As is generally known, plastic rods of this character, provided they are well polished, will transmit light from one end to the other thereof. The plastic rod may be straight or curved in any desired configuration so as to conduct light from lens 20 to the desired point on the control panel 1. An example of a suitable plastic is the acryloid polymer sold under the trade-name "Lucite."

If desired, the intermediate filter 17 may be clear so that when the filter support 14 is in the position illustrated, with solenoid coils 9 and 10 inactive, white light will be transmitted from the source 18 through rod 21 to the display point on the control panel. The other filters 17 may, if desired, be red and green respectively, so that when solenoids 9 or 10 are actuated the light transmitted to the control panel will appear as a red or a green light.

A number of arrangements may be employed for altering the appearance of the indicating light in response to the movements of a filter interposed between the light source and the conductive plastic rod. One alternative arrangement is illustrated in Figure 2. In this figure the filter support 30, corresponding to filter support 14 of Figure 1 is arranged as an elongated linear support carrying three filters 31 on different portions of the support. The filter support 30 may be coupled to a core support 32 carrying a core element 33 intermediate between two solenoid coils 34 and 35. Spring elements 36 fixed to either end of the filter support or the core support will serve to maintain this arrangement in a normal position so the light may pass from a source 37 through lens 38 and through an intermediate filter on the filter support 30 to a light transmitting rod 39. However, on actuation of solenoid coil 35, core 33 will be pulled towards the coil so as to move a different filter element 31 into the indicated light path. Alternatively, on operation of solenoid coil 34, the other of the three filter elements will be pulled into the path of light extending to the conducting rod 39. The arrangement of Figure 2 is of particular interest in providing a simple and effective means for moving any desired number of different filters in the path of the indicator light. Thus the indicated filter strip and core support may be extended to accommodate additional cores and actuating solenoid coils so as to permit variation of light characteristics by any desired number of filters.

At the present time sensing devices are available for determining virtually any desired process variable. For example, sensing devices may be used to indicate conditions of pressure, temperature, fluid level, variations in constituents of a composition, speed, pH, turbidity, etc. Again, apparatus is available for employing the output of these sensing devices to actuate circuits of the character referred to. In general, it is preferred that the sensing devices and associated control systems be of an electrical character so that electrical circuits and solenoids may be employed as described. However, hydraulic or pneumatic systems may also be employed and, if desired, systems of mechanical linkages may be employed as well. Thus, for example, in the diagram of Figure 1 the relay control system 6 may comprise a pneumatic control system associated with hydraulic lines corresponding to the electrical lines shown. The system may thus operate hydraulic pistons to cause movement of the filter support 14 in the general manner indicated. Again, it is apparent that mechanical systems may be used to secure this same result. For example, if indications of fluid level are desired, a simple system of mechanical linkages may be connected to a float on the fluid and to a filter support of the general character of filter 14 of Figure 1 or support 30 of Figure 2. Movement of the float will thus cause movement of the filter support so as to permit alteration of the indicator signal in the same general manner identified.

The light indicator system described is thus adaptable to any desired control system for the indication of any desired control information.

What is claimed is:

1. In a system for visually indicating variations in process operating conditions, including an indicating panel board, a light conductive plastic rod extended through said board to expose one end thereof in the face of the board, and a light source focussed on the other end of said rod so as to transmit a beam of light into and through said rod, a means for varying the color of the light transmitted according to variations of said process operating conditions comprising a reciprocally moveable shaft member, a series of individually actuatable shaft operating energy transmission means directly connected with said shaft longitudinally thereof so as to impart reciprocal movement to said shaft, spring means engaging said shaft so as to oppose reciprocal movement thereof and to substantially fix the position of said shaft when at rest, a series of color filters disposed in aligned edgewise relation intermediate said light source and said rod end on which focussed and in a line which intersects the light path from said source substantially at right angles thereto, a carrier support for said filters reciprocally moveable in right angular relation to said light path, and means connecting said carrier support to said shaft for reciprocal movement therewith and thereby and so as normally to dispose one of said series of filters in said light path, and means for actuating said transmission means individually according to variation of said process operating conditions.

2. An apparatus according to claim 1 in which said carrier support is pivotally mounted for arcuate reciprocal movement and including a slotted portion in said carrier support and a fixed pin on said shaft, said pin extended radially from the shaft into said carrier support slotted portion.

3. An apparatus according to claim 1 in which said carrier support is a rod member rigidly coupled to said shaft in parallel radially spaced relation thereto.

4. An apparatus according to claim 1 in which said shaft and carrier support are substantially integral opposite parallel legs of a generally U-shaped rod member of which one leg constitutes the reciprocally moveable shaft and the other leg constitutes the carrier support for said series of color filters.

5. In a system for visually indicating variations in process operating conditions, including an indicating panel board, a light conductive plastic rod extended through said board to expose one end thereof in the face of said board and a light source focussed on the other end of said rod so as to transmit a beam of light into and through said rod, a means for varying the color of the light transmitted according to variation of said process operating conditions, comprising an electrical relay actuated by such variation to energize and de-energize one of a series of electrical circuits, at least two solenoid coils, each connected in one of said circuits and energizable therewith, said coils disposed in spaced coaxial relation, a solenoid core support extended coaxially through said coils and mounted for reciprocal movement longitudinally thereof, spring means engaging said support so as to oppose reciprocal movement thereof and substantially to fix the position of said support when at rest, at least one solenoid core normally disposed intermediate any two solenoid coils, said core carried by said core support coaxially therewith and in relation to said coil, a series of three color filters disposed in aligned edgewise relation intermediate said light source and said rod end on which said source is focussed, and in a line which intersects the light path from said source substantially at right angles thereto, and a carrier support for said filters reciprocally moveable in right angular relation to said light path, said carrier support connected to said core support and reciprocally moveable thereby so as normally to dispose the middle one of said series of filters in said light path.

References Cited in the file of this patent
UNITED STATES PATENTS

| Number | Name | Date |
|---|---|---|
| 1,351,562 | Foster | Aug. 31, 1920 |
| 1,932,022 | O'Hagan | Oct. 24, 1933 |
| 2,035,998 | Thompson | Mar. 31, 1936 |
| 2,101,186 | Moore | Dec. 7, 1937 |
| 2,334,479 | Creager | Nov. 16, 1943 |
| 2,554,580 | Le Goff | May 29, 1951 |